US008079609B2

(12) United States Patent
Bell et al.

(10) Patent No.: US 8,079,609 B2
(45) Date of Patent: Dec. 20, 2011

(54) AERODYNAMIC BRAKE SYSTEM

(75) Inventors: Richard Bell, Venice, CA (US);
Timothy Saul Lane, Irvine, CA (US);
William Duehring, Newport Beach, CA (US); James Michael Felt, Auburn, CA (US); Jeffrey A. Soucek, Aliso Viejo, CA (US); David Tyson Buckenberger, Irvine, CA (US)

(73) Assignee: Felt Racing, LLC, Irvine, CA (US)

( * ) Notice: Subject to any disclaimer, the term of this patent is extended or adjusted under 35 U.S.C. 154(b) by 4 days.

(21) Appl. No.: 12/695,960

(22) Filed: Jan. 28, 2010

(65) Prior Publication Data

US 2011/0181015 A1    Jul. 28, 2011

(51) Int. Cl.
*B62K 19/30* (2006.01)
(52) U.S. Cl. ...................... 280/279; 188/24.12
(58) Field of Classification Search .............. 280/279, 280/281.1; 188/24.12, 24.21
See application file for complete search history.

(56) References Cited

U.S. PATENT DOCUMENTS

| 5,564,531 | A * | 10/1996 | Lumpkin ............... 188/24.19 |
| 6,308,806 | B1 * | 10/2001 | Nielsen ................. 188/24.11 |
| 7,878,521 | B2 * | 2/2011 | Blomme et al. ......... 280/281.1 |
| 2007/0068744 | A1 * | 3/2007 | Tsai ..................... 188/24.12 |
| 2008/0035431 | A1 * | 2/2008 | Vroomen et al. ......... 188/24.21 |

OTHER PUBLICATIONS

Specialized Shiv Carbon Fiber Tandem—AKA: The Supersonic Divorce Machine; Dec. 30, 2009; www.bikrumor.com; (Article: 3 pages).
Bicycle Brake Systems; www.wikipedia.org; (Article: 20 pages).
Bicycle Wheel; www.wikipedia.org; (Article: 15 pages).
Solutions for Tandem and Cyclocross Fans: Drop Bars and Brakes; http://tandem-fahren.de; (Article: 9 pages).
Project 0.05 Modeled After Nature; www.canyon.com; (Article: 9 pages).
Project 6.8; www.canyon.com; (Article: 9 pages).
Is this the Ultimate Tandem?; www.bikeradar.com; (Article: 2 pages).
Jones, Jeff; "World's Most Advanced Bicycle" on Sale at Harrods; www.bikeradar.com; (Article: 3 pages).
Rim Brakes 2010; www.magura.com; (Photos: 1 page).
Fuji D6; www.flickr.com; (Photo: 1 page).
Magura HS77; www.flickr.com; (Photo: 1 page).
Xenith T Series; ww.jamisbikes.com; (Article/Advertisment: 3 pages).
Magura HS77; www.traildevils.ch; (Photo: 1 page).
Time Trial Concept Bike; http://3.bp.blogspot.com; (Article: 1 page).

* cited by examiner

*Primary Examiner* — Paul N Dickson
*Assistant Examiner* — Tashiana Adams
(74) *Attorney, Agent, or Firm* — Stetina Brunda Garred & Brucker

(57) ABSTRACT

An aerodynamic braking system is disclosed herein. In particular, the brake arms may define an aerodynamic leading portion or edge and may be integrated into the legs of the front fork. Also, the brake arms may be disposed behind the bottom bracket shell to take the rear brake out of the air flow path and reduce aerodynamic drag. The rear brake arms are tapered so that the brake arms remain sufficient stiff to provide sufficient brake response times. The rear brake arms may be matched to recesses formed on an underside of chain stays.

10 Claims, 8 Drawing Sheets

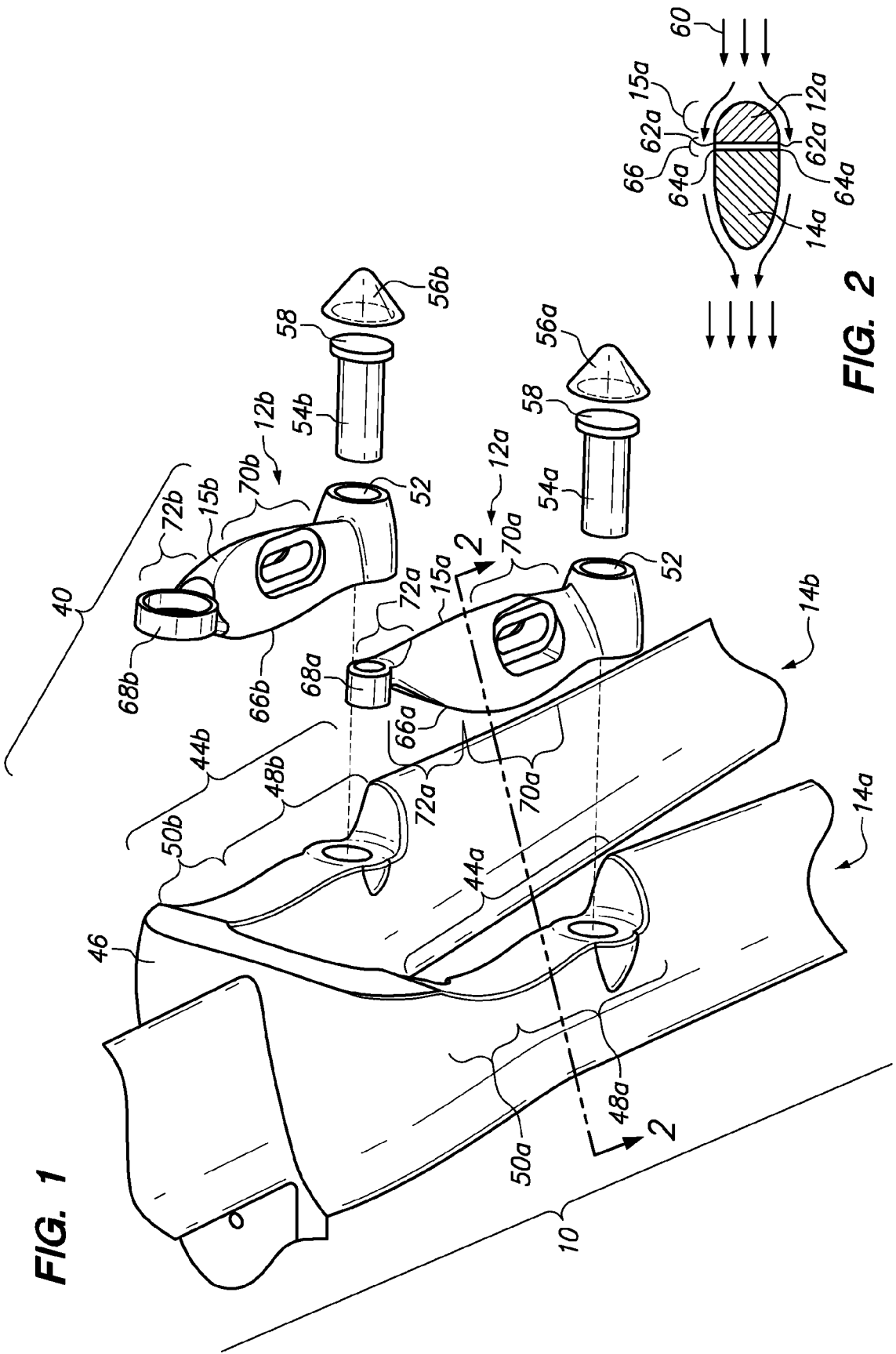

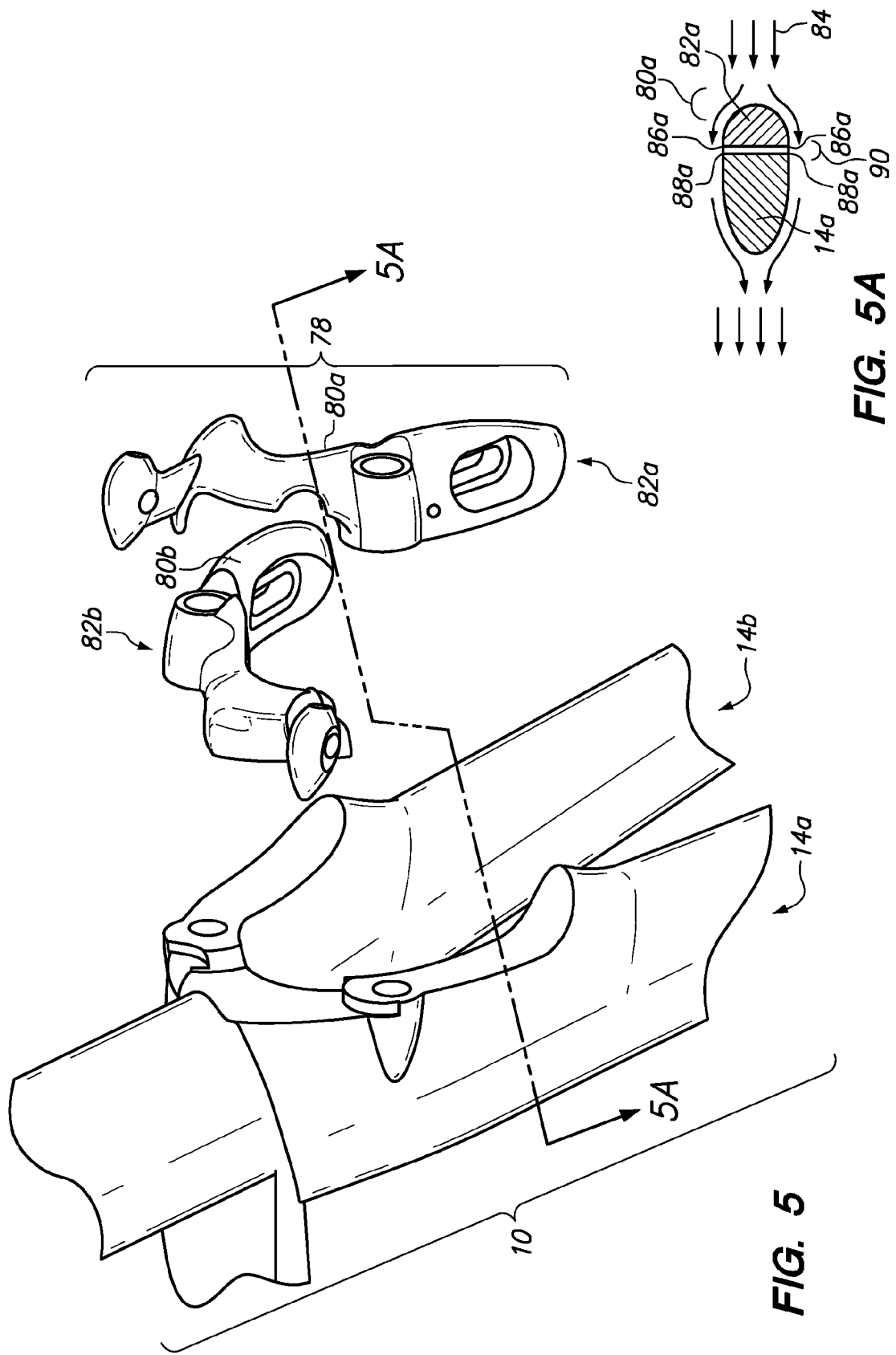

AERODYNAMIC BRAKE SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to an aerodynamic brake for a bicycle.

In time trial bicycles, reduction of aerodynamic drag is one area in which performance may be improved without any additional training. Prior art bicycles have been manufactured to have aerodynamic shapes. By way of example and not limitation, the frame may have an aerodynamic shape so as to reduce aerodynamic drag on the bicycle. Other areas of the bicycle have also been aerodynamically improved so as to reduce the overall aerodynamic coefficient of the bicycle. For example, the rims, the spokes, and the brakes.

Accordingly, there is a need in the art for an improved aerodynamic bicycle.

BRIEF SUMMARY

The bicycle disclosed herein addresses the needs discussed above, discussed below and those that are known in the art.

The bicycle disclosed herein incorporates rim brake arms in a front fork or chain stays of the bicycle. With respect to the front brakes, the front brake arms are disposed in front of the front forks. The legs of the front fork have recesses which receive the front brake arms. Collectively, the front brake arms and the legs of the fork define an aerodynamic cross sectional configuration. The front brake arms themselves define the leading edge of that aerodynamic shape. Accordingly, the aerodynamic characteristics of the front brake are increased while still leaving the front brake exposed. The benefit of having an exposed front brake is that during racing, the maintenance and repair of the front brake is more easily and conveniently accomplished.

Additionally, the rear brake may be tucked behind the bottom bracket shell so as to remove or substantially locate the rear brake out of the air flow path in the bottom bracket region. Any portions of the rear brake that extend out of the bottom bracket shell frontal footprint may aerodynamically shaped and blended to the bottom bracket region, if needed. The cantilever style brakes shown in the Figures may also be replaced with U-style brakes that may be incorporated or integrated into the front fork or chain stays.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a perspective view of a fork with front brake;

FIG. 2 is a cross sectional view of a leg of the front fork and a brake arm of the front brake;

FIG. 5 is a perspective view of a front fork with a U-style rim brake;

FIG. 5A is a cross sectional view of a leg and brake arm of the front fork and front U-style rim brake shown in FIG. 5;

DETAILED DESCRIPTION

Referring now to FIG. 1, a front fork 10 is shown with brake arms 12a, b that are integrated into the legs 14a, b of the front fork 10. The legs 14a, b and the brake arms 12a, b may collectively have an aerodynamic shape (e.g., tear drop shape). The leading portion 15a, b of the brake arms 12a, b may have a curved surface to assist in reducing aerodynamic drag caused by air passing by the front fork 10. The curved surface promotes laminar flow of air.

Figure 3:
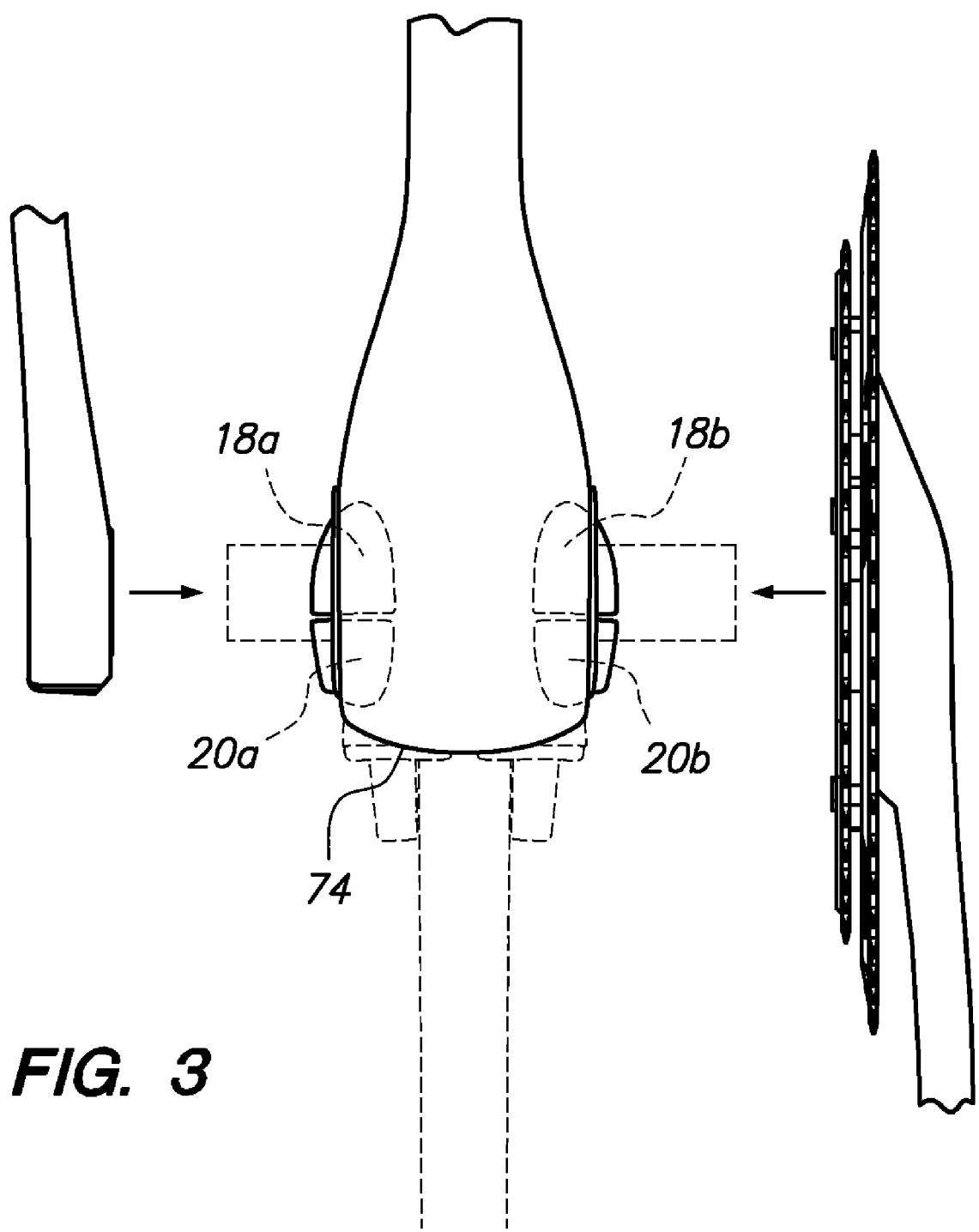
FIG. 3 is a front view of a bottom bracket shell with a rear brake disposed behind the bottom bracket shell.
Figure 4:
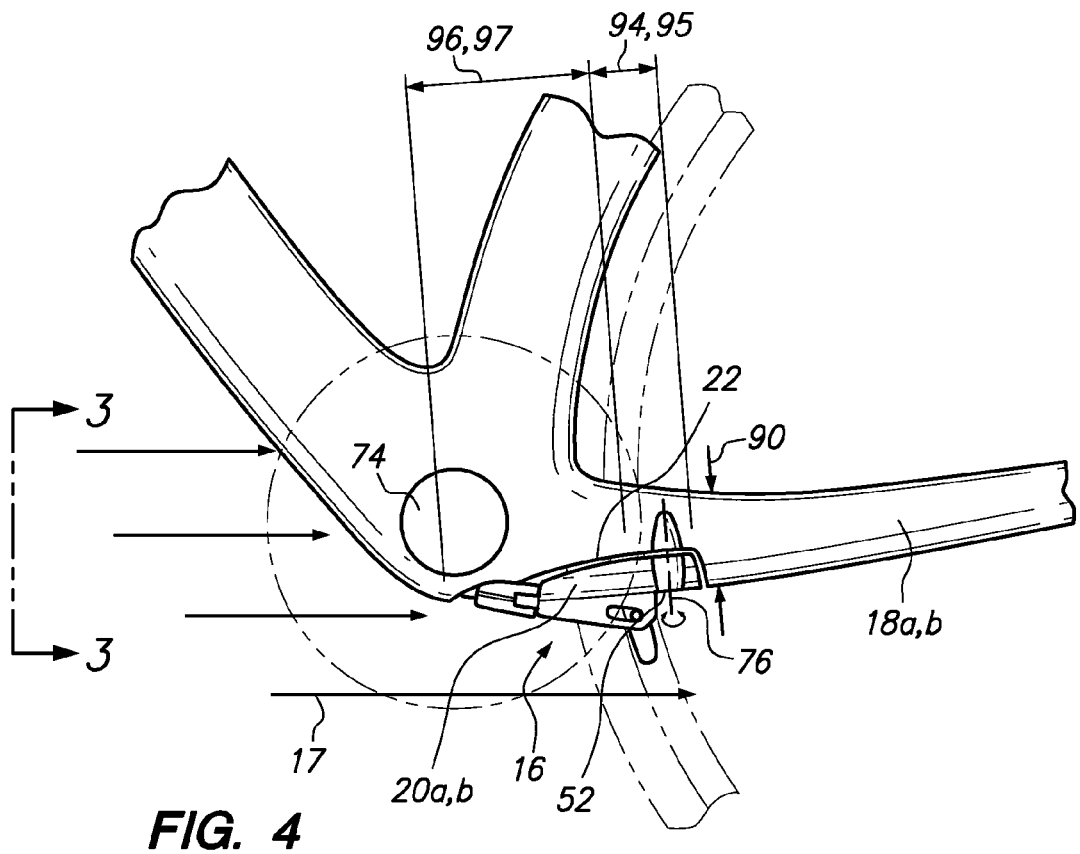
FIG. 4 is a side view of FIG. 3.

Referring now to FIG. 4, the rear brake 16 may be integrated into the chain stays 18a, b. In particular, brake arms 20a, b may fit within a recess 22 formed in the chain stays 18a, b so that the brake arms 20a, b are out of the air flow path 17 as the bicycle 24 is propelled in a forward direction. This reduces the frontal surface area (see FIG. 3) and aerodynamic drag of the bicycle 24. The brake arms 20a, b may also be tapered and fitted into corresponding recesses in the underside of the chain stays 18a, b to retain sufficient stiffness of the brake arms 20a, b and also retain sufficient stiffness of the chain stays 18a, b.

Additionally, the drawings also illustrate disc brakes (see FIGS. 6 and 7) as opposed to rim brakes. The front disc brakes 26 may comprise two brake discs 28a, b. One brake disc 28a may be located on a right side of the front wheel 30. A second brake disc 28b may be located on the left side of the front wheel 30. Two sets of brake pads 32a, b is used to distribute the braking forces on both the left and right sides of the front wheel 30 so that both legs 14a, b of the front fork 10 evenly contribute to support the braking forces. On the rear wheel, as shown in FIG. 7, one brake disc 34 may be disposed on the non-drive side of the bicycle frame.

Figure 8:
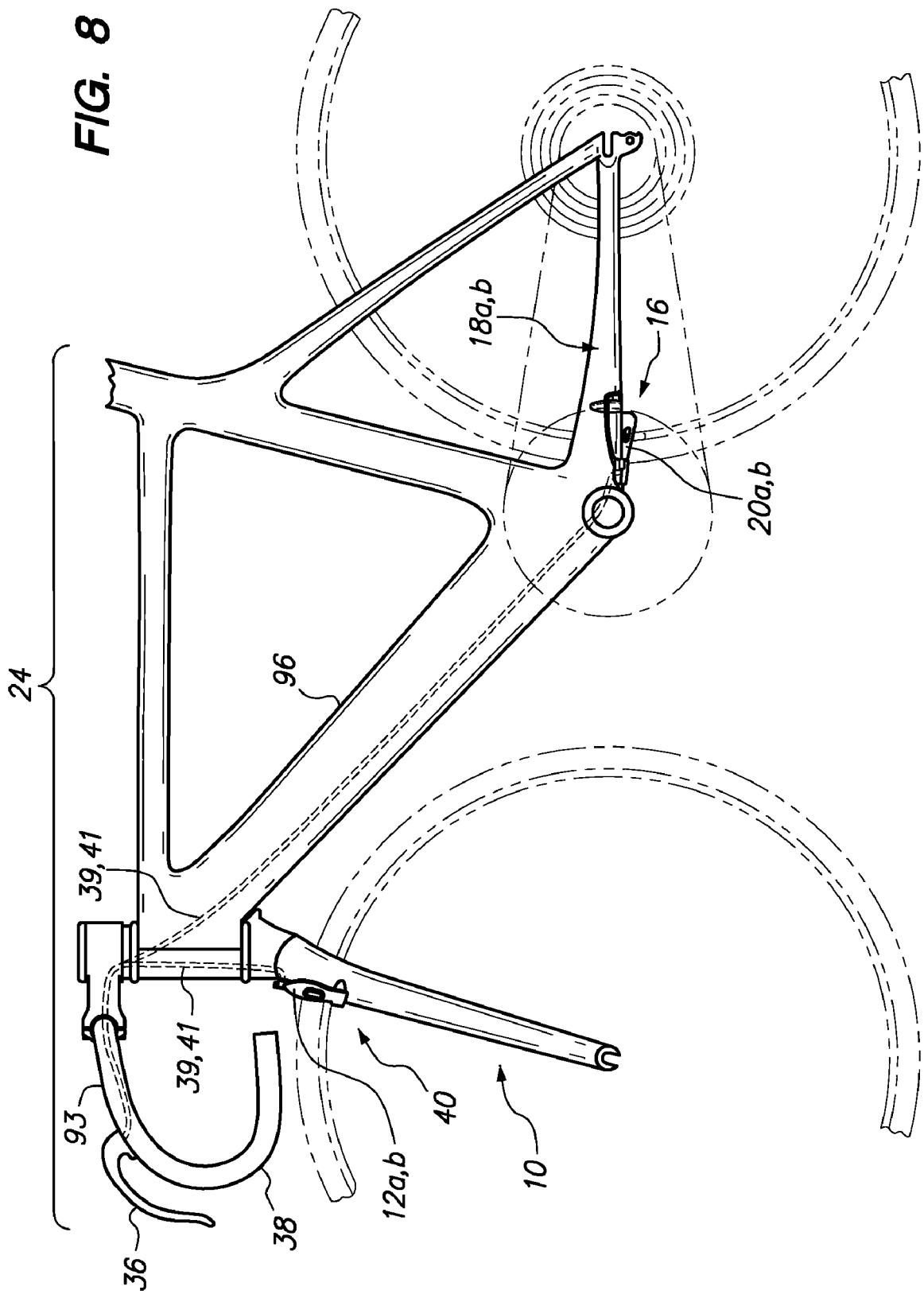
FIG. 8 is a side view of a bicycle with internally routed cable or hydraulic lines for actuating rim brakes.
Figure 9:
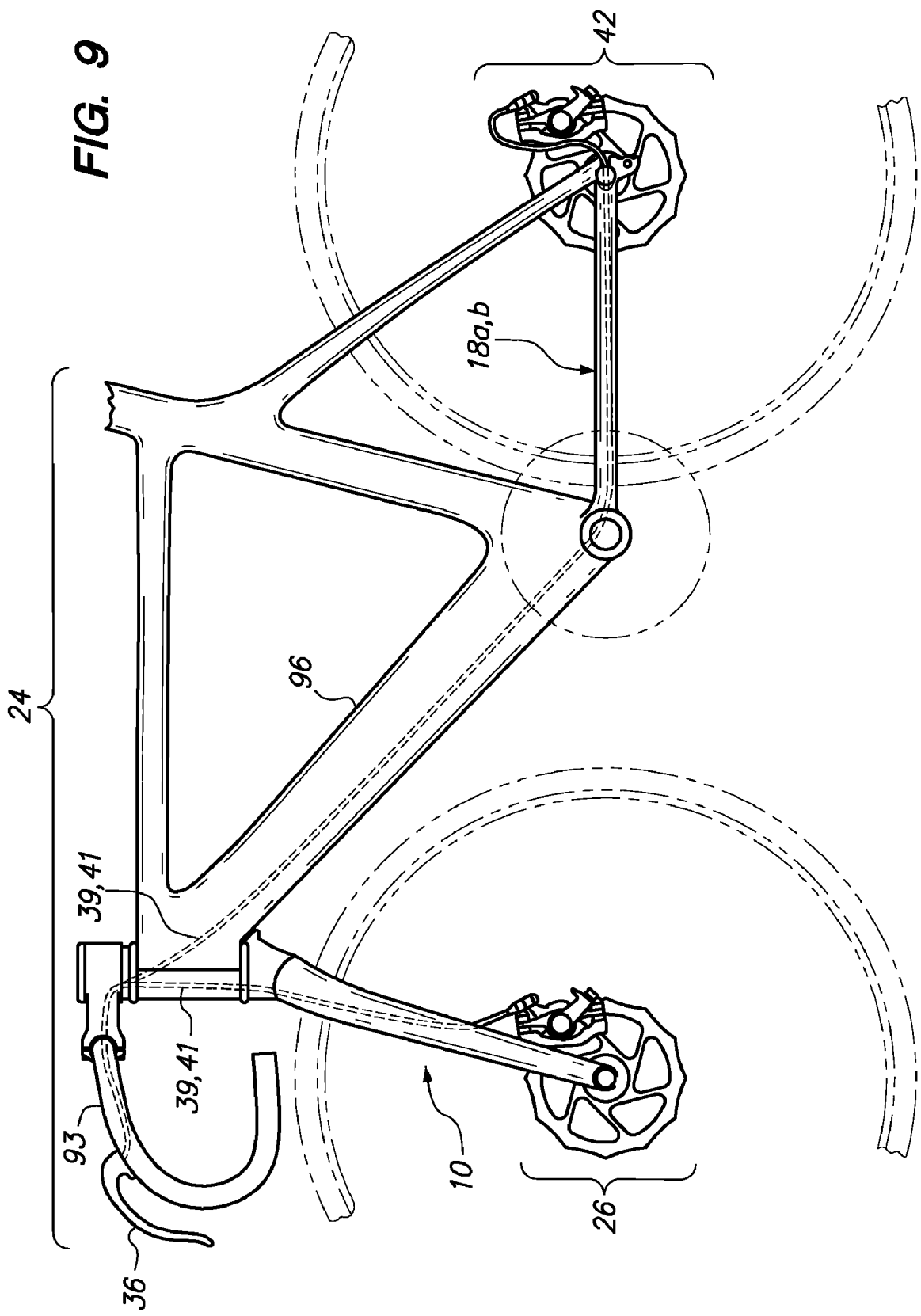
FIG. 9 is a side view of a bicycle with internally routed cable or hydraulic lines for actuating disc brakes.

As discussed above, the bicycle 24 may be mounted with rim brakes or disc brakes. Brake levers 36 are typically mounted to a handlebar 38 of the bicycle 24, as shown in FIGS. 8 and 9. Either a cable 39 or hydraulic line 41 may be routed between the brake levers 36 and the front rim brake 40 and rear rim brake 16 (see FIG. 8) or the front disc brake 26 or the rear disc brakes 42 (see FIG. 9). The hydraulic actuated rim brake combination allows greater force to be applied to the rim brakes. When the front brake arms 12a, b and the rear brake arms 20a, b are integrated into the front fork 10 and chain stays 18a, b, the brake arms 12a, b and 20a, b are shortened to accommodate various physical constraints in bicycle design. Due to the reduced length of the brake arms 12a, b and 20a, b, the hydraulic actuation compensates for the reduced mechanical advantage due to the shortened brake arms 12a, b and 20a, b. Additionally, the cable 36 or the hydraulic line 41 may be internally routed within the frame to reduce aerodynamic drag.

More particularly, referring now to FIG. 1, the front fork 10 may have recesses 44a, b in each of the legs 14a, b of the front fork 10. The recesses 44a, b are disposed immediately below a crown 46 of the front fork 10. In order to maintain sufficient strength requirements of the crown 46 of the front fork 10, the recesses 44a, b are tapered so that the bottom portions 48a, b of the recess 44 are deeper compared to the upper portions 50a, b of the recess 44. The front brake arms 12a, b are rotatably disposed within the recess 44 formed in the legs 14a, b. In particular, through holes 52a, b may be formed in the brake arms 12a, b of the front brake 40. Bolts 54a, b may be used to secure the brake arms 12a, b to the legs 14a, b of the front fork 10. Also, the brake arms 12a, b may pivot about the bolt 54. Caps 56a, b may be attached (e.g., snapped) over the bolt head 58. The exterior surface of the cap 56 may have an aerodynamic shape to reduce aerodynamic drag. The brake arms 12a, b of the front brake 40 may define the aerodynamic leading portions 15a, b. The leading portions 15a, b may have an aerodynamic shape. Preferably, the leading portions 15a, b may have a cross sectional curved shape so that the brake arms 12a, b and the legs 14a, b collectively form an aerodynamic shape such as a tear drop shape, as shown in FIG. 2A. The front brake arms 12a, b function both as brake arms 12a, b as well as a means to reduce aerodynamic drag caused by the front rim brake 40.

Referring now to FIG. 2, the cross sectional view of the leg 14a and the front brake arm 12a is shown. The air flow path 60 initially contacts the leading portion 15a to split the air flow 60 in two. The curvature of the leading portion 15a attempts to maintain laminar flow of the air flow 60. Rear edges of the front brake arm 12a may be aligned to rear edges 64a of the leg 14a of the front fork 10. The rear edge 62a may be aligned to the front edge 64a so that as the air flow 60 passes the transition 66 between the front brake arm 12a and the leg 14a, the air flow 60 maintains laminar flow. It is also contemplated that the front edge 62a may be offset to the outside of the rear edge 64a. A minute offset may prevent air flow 60 from hitting the front edge 64a of the leg 14a and prevent turbulence. As the air flow 60 continues onward, the air flow 60 flows on the leg 14a until it is rejoined to each other at the backside of the leg 14a.

As stated above, the depth of the upper portion 50a of the recess 44a may be shallower compared to the depth of the bottom portion 48a of the recess 44a. The purpose of this contour is to allow as much material in the crown 46 to provide as much structural stability to the crown 46 as possible. Preferably, also, the backside 66a, b of the brake arms 12a, b may have a corresponding curvilinear configuration. Starting from holes 52, the backside 66a, b curves away from the leading portion 15a then curves back toward the leading portion 15a until the backside 66a, b approaches the actuation mounting point 68a, b. When the backside 66a, b curves away from the leading portion 15a, additional material is added to the front brake arm 12a to provide stiffness to the front brake arm 12a. The stiffness prevents flexing during application of the braking force. Excessive flexing causes a delay in application of the braking force to the rim of the wheel 30. The backside 66a moves away from the leading portion 15a in the middle portion 70a then approaches the leading portion 15a in the upper portion 72a. Generally, upper portions 72a, b of the brake arms 12a, b are thicker compared to middle portions 70a, b of the brake arms 12a, b so that the brake arms 12a, b are relatively stiff to provide for acceptable brake response times.

During actuation of the front rim brake 40, the brake arms 12a, b will interfere with the flow of air 60 flowing past the medial side of the brake arms 12a, b. This interference may cause turbulence. However, the turbulence during slowdown of the bicycle is of no consequence since increased drag is desireable during slowdown of the bicycle.

Referring now to FIGS. 3 and 4, rear brake arms 20a, b may be attached to the underside of the chain stays 18a, b. The rear brake arms 20a, b may be disposed behind the bottom bracket shell as shown in FIG. 3 so that the rear brake arms 20a, b do not interfere with the air flow path 17 passing by the bottom bracket region 74. More particularly in reference to FIG. 4, the chain stays 18a, b may have recesses 22 which are cutouts extending laterally through the chain stays 18a, b. The cutouts provide room for the rear brake arms 20a, b. The rear brake arms 20a, b are pivotally mounted to pivot point 76. The recess 22 may cause more flex within the chain stays 18a, b. As a result, the chain stays 18a, b may be stiffened by increasing a height 90 of the chain stays 18a, b. Further, a width of the chain stays 18a, b may be increased to increase the stiffness of the chain stays 18a, b. The height 90 and/or width of the chain stays 18a, b may be increased to compensate for the change in stiffness and reaction due to the recess 22.

The recess 22 in the chain stays 18a, b may have a similar configuration compared to the recesses 44a, b formed in the legs 14a, b of the front fork 10. In particular, a pivoting end portion 94 may be deeper compared to an actuating end portion 96. Moreover, the rear brake arms 20a, b may be tapered so as to be stiffer at through holes 52 for pivotally mounting the rear brake arms 20a, b to the chain stays 18a, b. In this regard, pivoting end portions 95 of the brake arms 20a, b may be generally thicker compared to the actuation portions 97 of the brake arms 20a, b so that the brake arms 12a, b are relatively stiff to provide for acceptable brake response times.

Figure 4A:
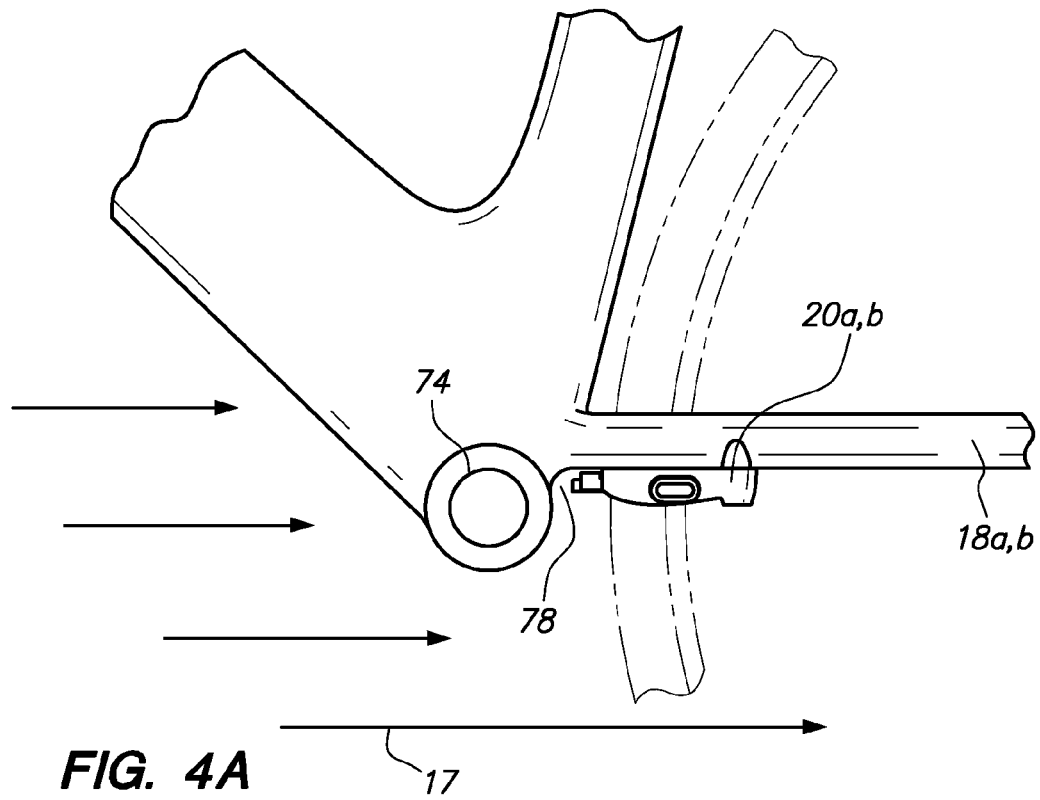
FIG. 4A is an alternate embodiment of the rear rim brake shown in FIG. 4.

As an alternative to the embodiment shown in FIG. 4, a recess is not formed on the underside of the chain stays 18a, b as shown in FIG. 4A. Rather, the chain stays 18a, b attach to the bottom bracket shell 74 at a higher location so as to create a gap or space 78 behind the bottom bracket shell 74. The rear brake arms 20a, b may be pivotally attached to the chain stays 18a, b on its underside and behind the bottom bracket shell 74 so that the rear brake arms 20a, b are out of the way of the air flow path 17 as a bicycle is moving forward.

Referring now to FIG. 5, a U style rim brake 78 is shown. Similar to the cantilever style brake shown in FIGS. 1 and 2, the leading portions 80a, b of the brake arms 82a, b may have a curved aerodynamic configuration that may blend with the legs 14a, b of the front fork 10. FIG. 5A is a cross sectional view of the leg 14a and brake arm 82a. Although the cross sectional view of leg 14b and brake arm 82b are not shown, the cross section of the leg 14b and brake arm 82b may have the same or mirror configuration as the cross sectional view shown in FIG. 5A. When the bicycle is moving forward, the air flow 84 may initially engage the leading portion 80a and splits the air flow 84 into two streams. One stream on the left of the brake arm 80a, and one stream on the right of the brake arm 80a. The curved aerodynamic leading portions 80a, b may promote laminar flow of air. Rear edge 86a of the brake arm 82a may be aligned with front edge 88a of the leg 14a so as to promote laminar flow past the transition 90 between the brake arm 82a and the leg 14a. The air is rejoined to each other once the air passes the leg 14a. Alternatively, the rear edge 86a of the brake arm 82a may be slightly offset to the outside with respect to the front edge 88a of the leg 14a so as to prevent air from abruptly contacting the front edge 88a of the leg 14a and causing turbulence.

A U-style rim brake may also be incorporated into the underside of the chain stays 18a, b by tucking the U-style rim brake behind the bottom bracket shell and out of the air flow path 17 at the same position as cantilever style brake discussed herein. In particular, recesses may be formed on the underside of the chain stays 18a, b in which the brake arms of the U-style rim brake may fit. The brake arms of the U-style rim brake may have a minor configuration compared to the recesses so that the recesses and the brake arms of the U style rim brake are matched to each other as discussed in relation to FIG. 4 above. Alternatively, the chain stays 18a, b may be raised as shown in FIG. 4A to create a gap 78 and provide space to fit the U style rear rim brake.

Figure 6:
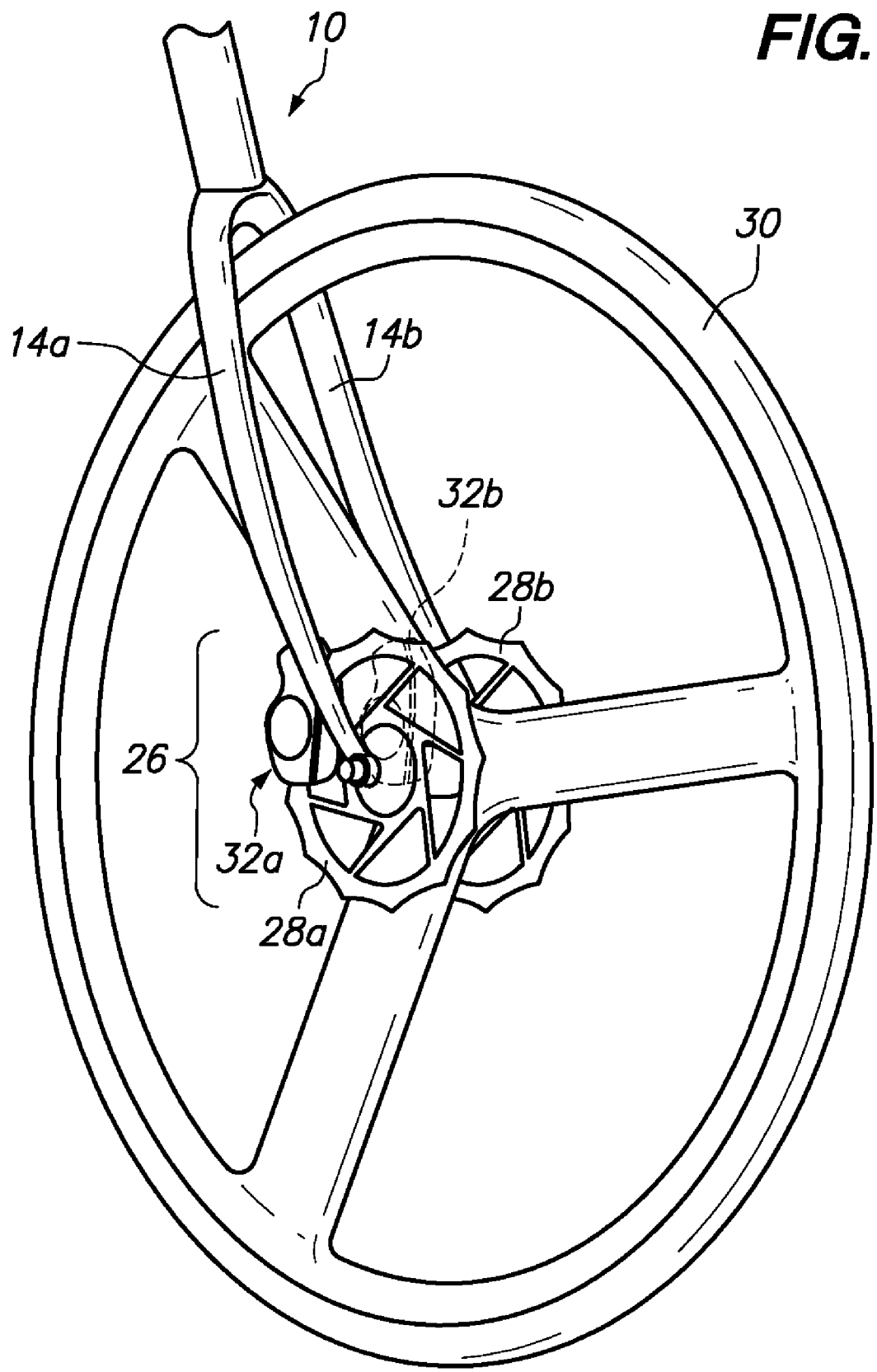
FIG. 6 is a perspective view of a front disc brake system.
Figure 7:
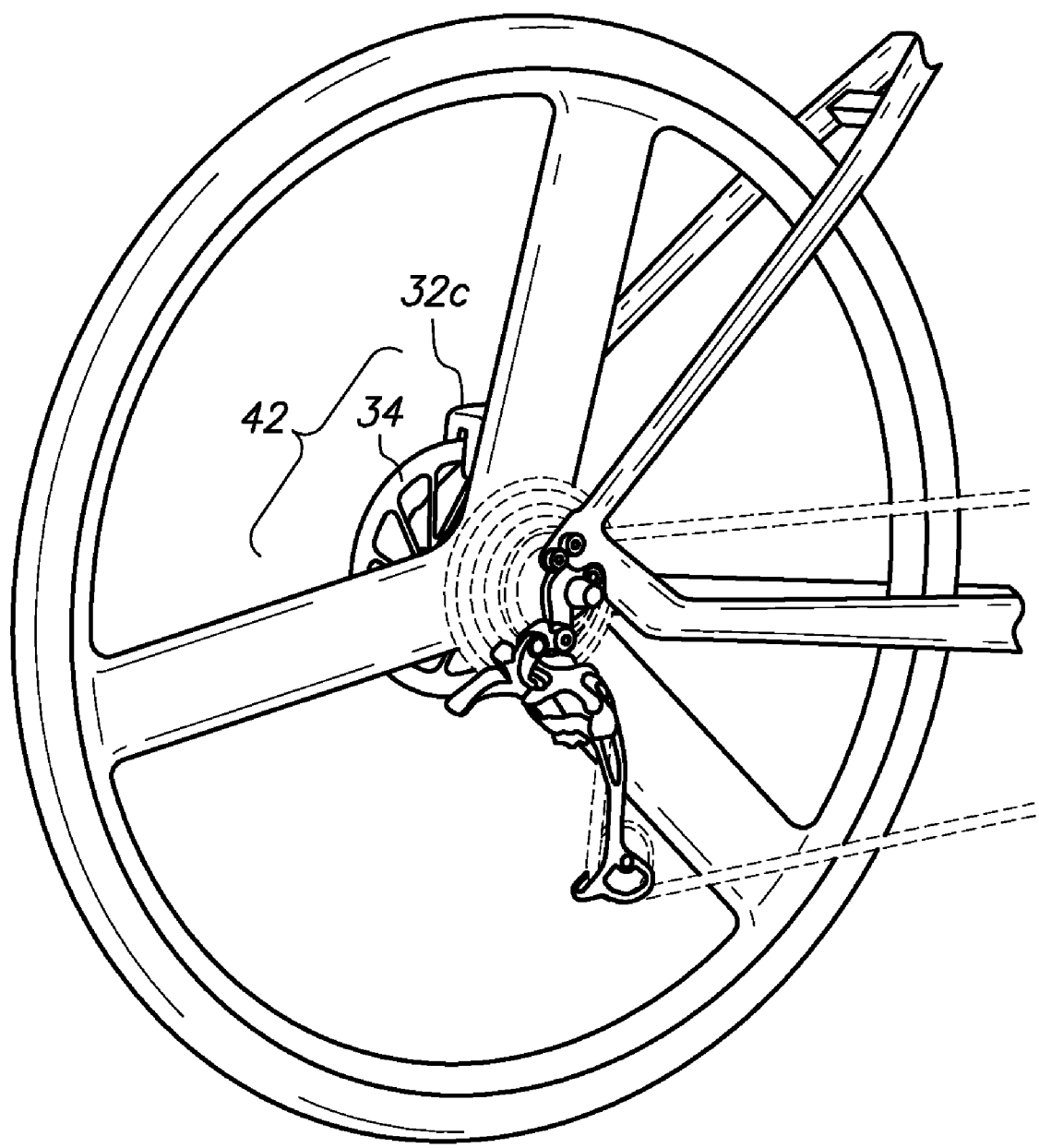
FIG. 7 is a perspective view of a rear disc brake system.

Referring now to FIGS. 6 and 7, the rim brakes 16, 40 may be replaced with disc brakes 26, 42. The front disc brake 40 may comprise two discs 28a, b. One disc 28a may be mounted on one side of the front wheel 30. A second disc 28b may be mounted on the other side of the front wheel 30. A first set of brake pads 32a may be attached to the leg 14a and be operative to engage the disc 28a for stopping the bicycle. A second set of brake pads 32b may be attached to the leg 14b and be operative to engage the disc 28b for stopping the bicycle. The two discs 28a, b distribute the stopping force on both of the legs 14a, b so as to evenly apply braking force to the bicycle. This mitigates pulling of the handle bar to one side. Additionally, this reduces the load that any one of the legs 14a, b supports in slowing down the bicycle.

The rear wheel 92 may have a first disc 34 attached to the non drive side of the rear wheel 92, as shown in FIG. 7. A first set of brake pads may engage the disc 34 for stopping or slowing down the bicycle.

Referring now to FIG. 8, front and rear rim brakes 40, 16 mounted to the bicycle 24 are shown. The front and rear rim brakes 40, 16 are in communication with the brake lever 36. Upon application of the brake levers 36, the front and/or rear rim brakes 40, 16 are actuated and slow down the bicycle 24. The front and rear rim brakes 40, 16 may be cable actuated or hydraulically actuated and communicate with the brake lever 36 by way of the cable 39 or hydraulic line 41. The cable line 39 or hydraulic line 41 is shown as being internally routed through the handlebar 93 and down tube 96. Other internal routes through the frame of the bicycle 24 are also contemplated. The internal routing of the cable line 39 or the hydraulic line 41 takes the cable line 39 or the hydraulic line 41 out of the air flow path of the bicycle to mitigate increased aerodynamic drag.

Referring now to FIG. 9, front and rear disc brakes 26, 42 mounted to the bicycle 24 are shown. The front and rear disc brakes 26, 42 are in communication with the brake lever 36. Upon application of the brake levers 36, the front and/or rear disc brakes 26, 42 are actuated and slow down the bicycle 24. The front and rear disc brakes 26, 42 may be cable actuated or hydraulically actuated and communicate with the brake lever 36 by way of the cable 39 or hydraulic line 41. The cable line 39 or hydraulic line 41 is shown as being internally routed through the handlebar 93 and down tube 96. Other internal routes through the frame of the bicycle 24 are also contemplated. The internal routing of the cable line 39 or the hydraulic line 41 takes the cable line 39 or the hydraulic line 41 out of the air flow path to mitigate increased aerodynamic drag and improve the bicycle's aerodynamic characteristics.

The above description is given by way of example, and not limitation. Given the above disclosure, one skilled in the art could devise variations that are within the scope and spirit of the invention disclosed herein, including various ways of internally routing the cable or hydraulic lines. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A bicycle having an aerodynamic brake system, the bicycle comprising:
    left and right cantilever brake arms having an aerodynamic teardrop shape leading portion; and
    a front fork having left and right legs, each of the legs defining a leading edge and a trailing edge with an aerodynamic teardrop shape cross section, each of the legs having a recess at a leading portion of the leg with the left and right cantilever brake arms disposed within the recesses of the left and right legs wherein the exterior surfaces of the left and right cantilever brake arms and exterior surfaces of the left and right legs collectively have a teardrop aerodynamic cross sectional configuration.

2. The bicycle of claim 1 wherein the left and right cantilever brake arms are thicker at pivoting portions compared to actuation portions of the left and right cantilever brake arms for providing additional stiffness to the left and right cantilever brake arms.

3. The bicycle of claim 1 wherein the recesses are shallower closer to a crown of the fork for stiffening the crown of the fork.

4. A bicycle having an aerodynamic brake system, the bicycle comprising:
    left and right cantilever brake arms, each of the left and right cantilever brake arms define a pivoting portion and an actuation portion with the pivoting portion being stiffer than the actuation portion; and
    a frame defining a bottom bracket shell and left and right chain stays, each chain stay having a recess at a bottom side of the chain stays, the recess sized and configured to receive the left or right cantilever brake arm and match a profile of the left or right cantilever brake arm so that the left and right cantilever brake arms are entirely behind the bottom bracket shell and out of the air flow as the bicycle is moving forward;
    bolts attached to both the left and right cantilever brake arms for pivotally securing the left and right cantilever brake arms to the left and right chain stays.

5. The bicycle of claim 4 wherein the pivoting portions of the left and right cantilever brake arms are thicker compared to the actuation portions of the left and right cantilever brake arms for providing a sufficiently stiff brake arms to allow for responsive brakes.

6. A bicycle having an aerodynamic brake system, the bicycle comprising:
    left and right cantilever brake arms, each of the left and right cantilever brake arms define a pivoting portion and an actuation portion with the pivoting portion being stiffer than the actuation portion; and
    a frame defining a bottom bracket shell and left and right chain stays, each chain stay having a recess at a bottom side of the chain stays, the recess sized and configured to receive the left or right cantilever brake arm and match a profile of the left or right cantilever brake arm so that the left and right cantilever brake arms are substantially or entirely behind the bottom bracket shell and out of the air flow as the bicycle is moving forward;

wherein the pivoting portions of the left and right cantilever brake arms are pivotally mounted within the recesses of the left and right chain stays, and a first depth of the recesses adjacent the pivoting portions is greater than a second depth of the recesses adjacent to the actuation portions to provide for sufficiently stiff chain stays.

7. A bicycle having an aerodynamic brake system, the bicycle comprising:

left and right brake arms, each of the left and right brake arms defining a pivoting portion and an actuation portion; and a front fork having left and right legs, each of the legs having a recess for receiving the left and right brake arms, the recesses being closer to a crown of the leg than front dropouts, the left and right brake arms disposed within the recesses of the left and right legs, a first depth of the recesses adjacent the pivoting portions is greater than a second depth of the recesses adjacent to the actuation portions to provide for a sufficiently strong fork crown.

8. The system of claim 7 wherein the recesses are located at leading portions of the left and right legs.

9. A bicycle having an aerodynamic brake system, the bicycle comprising:

left and right brake arms, each of the left and right brake arms define a pivoting portion and an actuation portion; and left and right chain stays, each of the chain stays having a recess for receiving the left and right brake arms, the recesses being closer to a bottom bracket shell than rear dropouts, the left and right brake arms disposed within the recesses of the left and right legs, a first depth of the recesses adjacent the pivoting portions is greater than a second depth of the recesses adjacent to the actuation portions to provide for a sufficiently strong fork crown.

10. The bicycle of claim 9 wherein the recesses are located underneath the chain stays.

* * * * *